Figure 1:
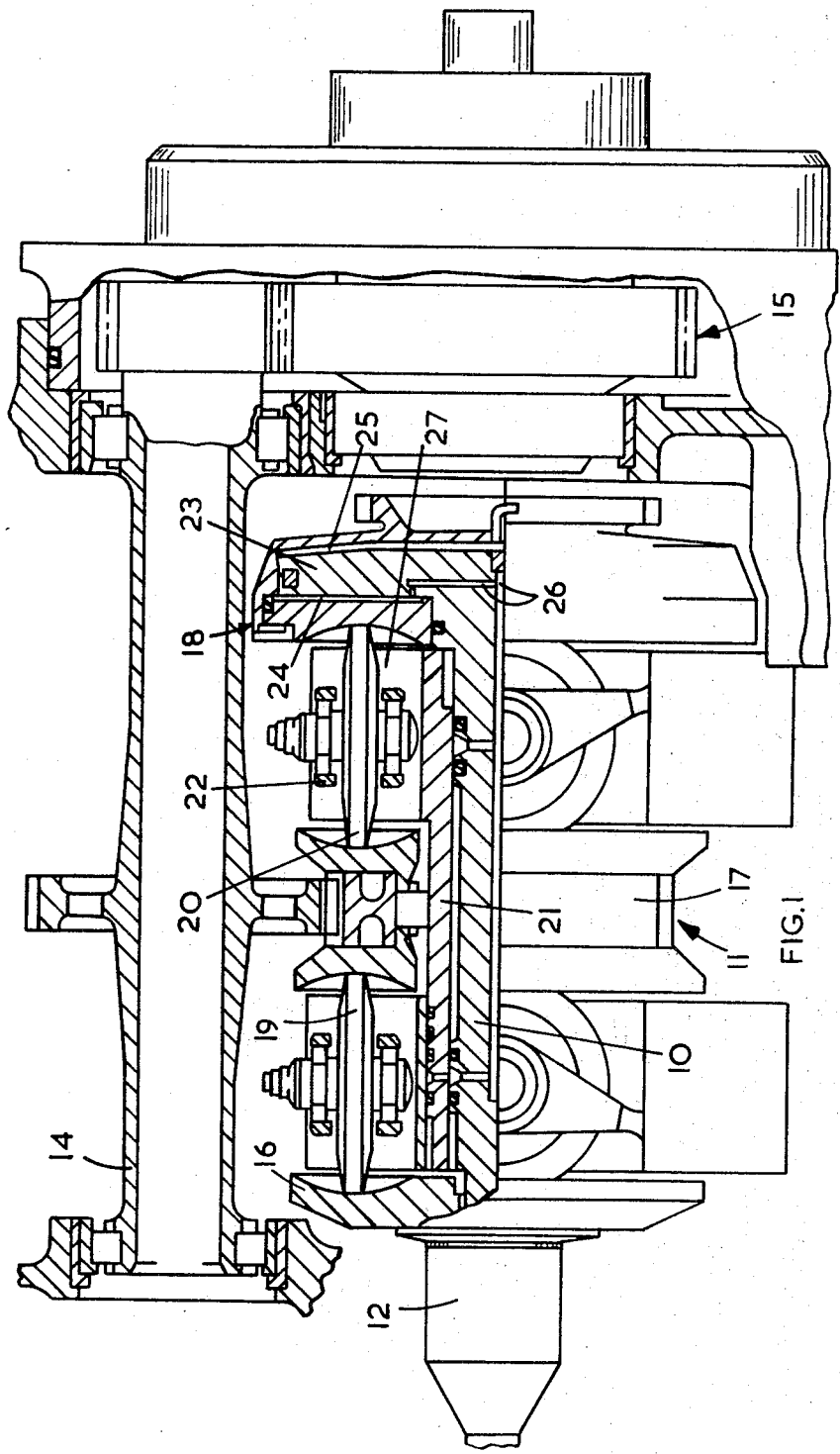

United States Patent [19]

Magill

[11] 3,826,148

[45] July 30, 1974

[54] CONSTANT SPEED OUTPUT TORIC TRANSMISSION WITH HYDRAULIC CONTROLS CONSISTING OF A ROTATABLE SPIDER, AN ACTUATING VALVE AND GOVERNOR MEANS

[75] Inventor: George Maurice Martin Magill, Menston, England

[73] Assignee: Rotax Limited, Birmingham, England

[22] Filed: July 27, 1972

[21] Appl. No.: 275,883

[30] Foreign Application Priority Data
July 27, 1971 Great Britain.................... 35323/71

[52] U.S. Cl. ................................................ 74/200
[51] Int. Cl............................................. F16h 15/38
[58] Field of Search........................ 74/190, 200, 208

[56] References Cited
UNITED STATES PATENTS
2,959,972  11/1960  Madson ............................... 74/200
3,276,279  10/1966  Perry et al. ........................... 74/200
3,413,864  12/1968  Magill et al.......................... 74/200

Primary Examiner—Samuel Scott
Assistant Examiner—Allan Russel Burke
Attorney, Agent, or Firm—Holman & Stern

[57] ABSTRACT
A variable-ratio frictional drive gear comprises two axially spaced torus discs between which there is a set of circumferentially spaced drive rollers in frictional rolling contact with toroidal surfaces on the discs. Each roller is rotatably mounted in a roller carriage which can tilt about an axis at right angles to the axis of rotation of the roller so as to vary the distances from the gear axis at which the roller engages respectively the two discs, thus varying the drive ratio of the gear. The end portions of each roller carriage are slidably and rotatably supported by a support member whereby the roller carriages can be moved tangentially in order to control indirectly the ratio angle of the rollers. One end portion of each roller carriage has a piston which is slidable in a pressure cylinder in the support member and the other end portion has a guide portion slidable in a guide cylinder in the support member. The latter is mounted about a shaft to which the torus discs are rotatably connected, the support member being rotatable relative to the shaft and being urged, in use, against the valve member of a valve which is connected in an hydraulic control circuit arranged to control the tilting movement of the roller. The arrangement is such that the pressure exerted by the support member on the valve member is dependent upon the reaction force existing between the rollers and the torus discs so that an increase (decrease) in the pressure exerted by the support member and the valve member will cause an increase (decrease) of hydraulic fluid pressure in the control circuit.

4 Claims, 2 Drawing Figures

CONSTANT SPEED OUTPUT TORIC TRANSMISSION WITH HYDRAULIC CONTROLS CONSISTING OF A ROTATABLE SPIDER, AN ACTUATING VALVE AND GOVERNOR MEANS

This invention relates to variable-ratio frictional drive gears of the kind comprising two axially spaced torus discs between which there is a set of circumferentially spaced drive rollers in frictional rolling contact with toroidal surfaces on the discs, each roller being rotatably mounted in a roller carriage which can tilt about an axis at right angles to the axis of rotation of the roller so as to vary the distances from the gear axis at which the roller engages respectively the two discs, thus varying the drive ratio of the gear. The angle of tilt of the roller carriages, as it controls the drive ratio the the gear is called "ratio angle". One such frictional drive gear is shown and described in U.S. Patent specification Ser. No. 3,413,86."

It is an object of the present invention to provide a variable-ratio frictional drive gear in a convenient form.

In accordance with the present invention there is provided a variable-ratio frictional drive gear comprising two axially spaced torus discs between which there is a set of circumferentially spaced drive rollers in frictional rolling contact with toroidal surfaces on the discs, each roller being rotatably mounted in a tangentially controlled roller carriage having end portions lying on a roller tilt axis at right angles to the axis of rotation of the roller, the end portions of each roller carriage being slidably and rotatably supported by a support member whereby the roller carriages can be moved tangentially in order to control indirectly the ratio angle of the rollers, one end portion of each roller carriage having a piston which is slidable in a pressure cylinder in the support member and the other end portion having a guide portion slidable in a guide cylinder in the support member, the latter being mounted about a shaft to which the torus discs are rotatably connected, said support member being rotatable relative to said shaft and being urged, in use, against a valve member of a valve which is connected in an hydraulic control circuit arranged, in use, to control the tilting movement of said rollers, the arrangement being such that the pressure exerted by said support member on said valve member is dependent upon the reaction force existing between the rollers and the torus discs so that an increase (decrease) in the pressure exerted by the support member on the valve member will cause an increase (decrease) of hydraulic fluid pressure in the control circuit.

The invention will now be more particularly described with reference to the accompanying drawings wherein:-

Figure 2:
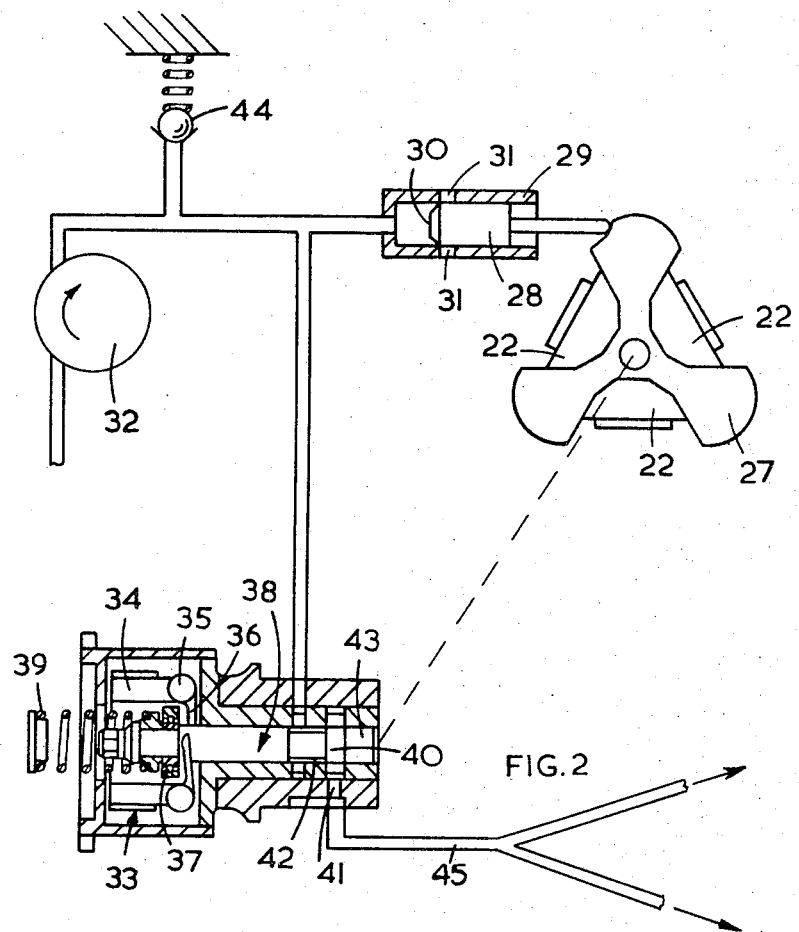

FIG. 1 is a sectional view of part of one embodiment of a variable ratio frictional drive gear according to the present invention, and FIG. 2 is a diagrammatic view of the further part of the embodiment illustrated in FIG. 1.

Referring to FIG. 1 of the drawings, there is shown therein a variable-ratio frictional drive gear 11 having an output shaft 10 which drives a load shaft 12. The input of the gear 11 is transmitted through a lay shaft 14 from a gear train which is indicated by the reference numeral 15.

The gear 11 consists of three torus discs 16, 17 and 18 between which two sets of rollers 19 and 20 are in frictional rolling engagement, the central disc 17 being double sided. This central torus disc 17 is rotationally connected to the lay shaft 14 (with freedom to move slgihtly axially) and is mounted on bearings within a sleeve member 21. The outer disc 16 is secured to the output shaft 10 for rotation therewith and so as to be axially fixed with respect to the shaft 10, whilst the other outer disc 18 is connected to the output shaft for rotational movement therewith and axial movement relative thereto. The drive ratio of the gear 11 is varied by altering the ratio angle of the rollers. As shown in FIG. 1, the rollers 19, 20 are shown at a ratio angle at which they engage the central disc 17 at an equal radius to that of the outer disc 16 and 18 respectively, thus the gear as shown transmits a drive at a 1:1 ratio. The rollers 19,20 are mounted in roller carriages 22 and control of the ratio angle is achieved by bodily moving the roller carriages 22 in substantially tangential directions with respect to the gear axis, and by allowing the rollers then to steer themselves towards a different ratio angle. The roller carriages are arranged so that a camber angle is furnished, that is to say an angle of inclination exists between the tilt axis of each roller carriage and a plane normal to the gear axis. This camber angle gives rise to a desirable mode of damping which can virtually eliminate any tendency for ratio angle oscillation and this facilitates the design of a highly stable gear without the need for elaborate additional damping devices for achieving the necessary damping. Furthermore, the degree of camber angle provided together with the maximum available tangential movement of each roller carriage will dictate the maximum degree of tilt (or ratio angle change) of the roller carriage.

The disc 18 is hollow and there is provided within the disc 18 a piston 23 which is secured to the output shaft 10. The piston 23 defines two axially spaced chambers 24 and 25 between opposed axial sides of the piston and the hollow disc 18. Pressurised fluid can thus be fed into the chamber 24 via passages 26 to effect axial movement of the disc 18 whilst fluid from a relatively low pressure source can be fed into the chamber 25. Thus, pressure of fluid in the chamber 25 induced by centrifugal force on rotation of the gear 11 will serve to balance or substantially balance fluid pressure in the chamber 24 similarly induced by centrifugal force.

As aforesaid, each roller is mounted in a roller carriage 22, and each roller carriage 22 has end portions (not shown) lying on a roller tilt axis at right angles to the axis of rotation of the roller. The aforesaid end portions of each roller carriage are slidably and rotatably supported by the arms of a spider member 27 (shown more particularly in FIG. 2) which forms a support member whereby the roller carriages can be moved tangentially in order to control indirectly the ratio angle of the rollers. One end portion of each roller carriage has a piston (not shown) universally connected thereto, said piston being slidable in a pressure cylinder in one of the spider arms, and the other end portion having a guide portion (not shown) universally connected thereto, said guide portion being slidable in a guide cylinder in another of the spider arms. The spider member is mounted about the sleeve 21 and thus the shaft 12 for angular movement relative to the sleeve 21.

Referring now more particularly to FIG. 2 of the drawings, the spider member 27 is urged, in use, against a valve member 28 of a valve 29 which is connected in an hydraulic control circuit arranged, in use, to control the tilting movement of the rollers 19, 20. The valve member 28 has a frusto-conical end portion 30 which is movable by the combined influence of the hydraulic pressure in the valve 29 and by the spider member 27, in use, proximate the region of two ports 31 formed in the body of the valve 29, the ports 31 being connected to drain. The frusto-conical end portion 30 of the valve member 28 defines together with the body of the valve 29 a cylindrical cavity into which, in use, is supplied hydraulic fluid from a source in the form of a pump 32. The pump 32 also supplies hydraulic fluid to an input of a governor 33 which is driven by the load shaft 12 (shown in FIG. 1) to maintain the speed of the latter at a constant value. The governor is of a conventional form and includes pivoted weights 34 which are pivoted on pins 35 and which are rotatable bodily about the axis of the governor so that inwardly directed finger portions 36 on the weights bear upwards on a flange 37 of a piston valve 38, against the action of a spring 39, with a force which increases with increasing rotational speed owing to centrifugal force on the weights. When the speed of rotation of the load shaft 12 is at the desired value, a land portion 40 of the piston valve is centrally disposed with respect to a hydraulic fluid outlet in the form of a port 41 which is connected to a supply pipe 45 itself connected to the aforesaid pressure cylinders formed in the spider member through passages formed integrally in that member (not shown), and also to the chamber 24 through passage 26 communicating therewith (shown in FIG. 1). FIG. 2 shows the passage 45 diagrammatically divided to indicate such connections; The pump 32 will, in use, supply hydraulic fluid as aforesaid to the input of the governor which communicates with an annular chamber 42 defined by the piston valve 38. When, in use, the load shaft is rotating at a speed below the desired value then the land portion 40 will be so disposed that the annular chamber 42 will increase its communication with the port 41 to thus permit additional fluid to go through the governor to the aforesaid pressure cylinders and the chamber 24. The governor is also provided with a drain space 43 such that, in use, if the load shaft 12 obtains a speed above the desired value then the land portion 40 will be moved to the left (as viewed in FIG. 2) and hydraulic fluid within the supply pipe connected to the aforesaid pressure cylinders will be allowed to fall into the drain space to thus reduce the pressure of hydraulic fluid in the aforesaid pressure cylinders and the chamber 24.

It is preferable that a pressure relief valve 44 is incorporated within the hydraulic supply circuit from the pump 32 to thereby cater for any fault conditions or surges which may occur within the control system.

In operation, the variable ratio frictional drive gear may conveniently be used to drive an aircraft alternator wherein the input of the gear rotates at a variable speed. Thus, assuming that the load shaft 12 is being driven at a constant speed, then if an additional load is applied to the alternator, an additional reactive force will be presented between the rollers and the torus discs and this will be such as to cause the spider member 27 to exert an additional pressure on the valve member 28 to thereby urge the frusto-conical end portion 30 to a position in which it reduces the fluid escape passage existing between the aforesaid cylinder and the ports 31. The pressure of hydraulic fluid supplied to the input of the governor will therefore increase and this will cause the pressure of hydraulic fluid supplied by the governor to the aforesaid pressure cylinders and the chamber 24 to increase to thereby compensate for the additional load applied to the alternator. If the load on the alternator is reduced, then the pressure exerted by the spider 27 on the valve member 28 will decrease due to a reduced reactive force between the rollers and the torus discs and the control circuit will then act in the opposite sense to compensate for this change in load on the alternator.

Thus it will be seen that the above described hydraulic circuit will serve to compensate for any changes in load on the alternator without or substantially without any substantial change of speed thereof. The position of the governor 33 does not move or will only move slightly.

Furthermore, as the alternator is being run up from standstill the land portion 40 of the piston valve 38 will be displaced to the right (as viewed in FIG. 2) and therefore the governor will supply a larger hydraulic fluid pressure to the aforesaid pressure cylinders in the chamber 24 and this may be in excess of the pressure desired, but if this is so the reactive force between the rollers and the torus discs will be such as to allow the valve member 28 to move towards the right (as viewed in FIG. 2) to thereby increase the passage between the aforesaid cylinder and the ports 31 and this will cause a decrease in the hydraulic fluid supply to the governor.

By virtue of the fact that the same hydraulic fluid is fed to the chamber 24 as is supplied to the aforesaid pressure cylinders, the axial loading force by which the torus discs are urged together will always be proportional to the force applied to the rollers. Thus the axial loading is automatically maintained substantially at an appropriate value which is at all times neither too low nor unnecessarily high for permitting the rollers to achieve the required frictional transmission.

I claim:

1. A variable ratio frictional drive gear comprising two axially spaced torous discs having respective toroidal mutually presented surfaces, a set of circumferentially spaced drive rollers in frictional rolling contact with the toroidal surfaces on the discs, a tangentially controlled roller carriage in which each of the rollers is rotatably mounted respectively, end portions of the roller carriages lying on respective roller tilt axes at right angles to axes of rotation of the rollers respectively, a support member whereby the end portions of the roller carriages are slidably and rotatably supported to permit the roller carriages to be moved tangentially in order to control indirectly the ratio angle of the rollers, a piston at one end portion of each roller carriage, a pressure cylinder in which the piston is slidable, said cylinder being in the support member and a guide portion at the other end portion, a guide cylinder in the support member in which the guide portion is slidable, a shaft to which the torous discs are rotatably connected, and on which the support member is mounted, said support member being rotatable relatively to said shaft, a valve, a valve member of the valve on which the support member acts, an hydraulic control circuit to control the tilting movement of said rollers, in which the valve is connected, the force exerted by said support member upon said valve member being dependent upon the reaction force existing between the rollers of the torous discs, and change in the force exerted by the support member on the valve member will produce corresponding change of hydraulic fluid pressure in the control circuit.

2. A variable ratio frictional drive gear as claimed in claim 1 wherein a pump supplies hydraulic pressurised fluid to said control circuit and a centrifugal governor has an hydraulic fluid input which is connected to an output of said pump, said valve also being connected to said output of the pump thereby to control the pressure of hydraulic fluid supplied to the governor input.

3. A variable ratio frictional drive gear as claimed in claim 2 wherein an hydraulic fluid outlet of said governor is connected to said pressure cylinders, the degree of communication between said input and said outlet of the governor being varied, in accordance with speed of rotation of said governor.

4. A variable ratio frictional drive gear as claimed in claim 1 wherein the valve has a body with a port, said valve member being movable by said support member to a region of said port and a drain connected to said port, and movement of the valve member to vary the coverage of said port controls the pressure of fluid in said hydraulic control circuit.

* * * * *